(12) United States Patent
Biskeborn et al.

(10) Patent No.: US 7,782,567 B2
(45) Date of Patent: Aug. 24, 2010

(54) CLEANING SYSTEM FOR TAPE HEAD AND TAPE DRIVE SYSTEM IMPLEMENTING SAME

(75) Inventors: Robert Glenn Biskeborn, Hollister, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 11/781,842

(22) Filed: Jul. 23, 2007

(65) Prior Publication Data

US 2009/0027806 A1 Jan. 29, 2009

(51) Int. Cl.
*G11B 5/41* (2006.01)
(52) U.S. Cl. ....................................... 360/128
(58) Field of Classification Search ................ None
See application file for complete search history.

(56) References Cited

U.S. PATENT DOCUMENTS

| | | | | |
|---|---|---|---|---|
| 5,930,089 A * | 7/1999 | Anderson | ................... | 360/128 |
| 6,067,212 A * | 5/2000 | Poorman | ................... | 360/128 |
| 6,166,881 A * | 12/2000 | Anderson et al. | ........... | 360/128 |
| 6,344,947 B1 * | 2/2002 | Kudo | ........................ | 360/128 |
| 6,433,961 B1 * | 8/2002 | Tsuchiya et al. | ............ | 360/128 |
| 6,590,742 B2 * | 7/2003 | Yamakawa | .................. | 360/128 |
| 6,678,118 B2 * | 1/2004 | Tanaka et al. | ............... | 360/128 |
| 6,697,212 B2 * | 2/2004 | Tsuchiya | ...................... | 360/95 |
| 6,867,947 B2 | 3/2005 | Davis | ......................... | 360/128 |
| 7,372,668 B2 * | 5/2008 | Tsuneyoshi et al. | ......... | 360/128 |
| 7,558,021 B2 * | 7/2009 | Schuman | .................... | 360/128 |
| 2004/0136115 A1 * | 7/2004 | Nayak et al. | ................ | 360/128 |
| 2007/0263318 A1 * | 11/2007 | Nishimura et al. | ............ | 360/95 |

* cited by examiner

*Primary Examiner*—Mark Blouin
(74) *Attorney, Agent, or Firm*—Zilka-Kotab, PC (57) ABSTRACT

A tape drive system according to one embodiment includes a tape head; a guide mechanism for passing a magnetic recording tape over the head; and a cleaning device for cleaning the head, wherein, while the tape is adjacent the head, a relative spacing between the tape and the head is created before the cleaning device cleans the head, wherein the cleaning device does not contact the tape during cleaning of the head. Other systems and methods are also presented.

34 Claims, 8 Drawing Sheets

CLEANING SYSTEM FOR TAPE HEAD AND TAPE DRIVE SYSTEM IMPLEMENTING SAME

FIELD OF THE INVENTION

The present invention relates to tape drive systems, and more particularly, this invention relates to a cleaning systems for a tape heads and systems implementing such cleaning systems.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved magnetic read/write heads, improved error correction techniques and decreased areal bit sizes. The data capacity of half-inch magnetic tape, for example, is now measured in hundreds of gigabytes on 512 or more data tracks.

Occasionally in tape drives, error rates degrade as a result of accumulation of debris on the head. This debris can generally be removed by brushing or otherwise cleaning the head. However, drive space constraints hamper in situ head cleaning in a manner that does not jeopardize damaging the tape.

Another problem that is sometimes observed is suction. When the tape drive is in idle mode with the tape remaining in contact with the head, stiction between head and tape can develop. This can lead to a loss of tension or the tape sticking to the head. Combating stiction by roughening the head surface leads to spacing loss and tape wear. Preventing stiction by continuously moving the head with respect to the stationary tape can damage the tape and prematurely wear the head and actuator.

SUMMARY OF THE INVENTION

A tape drive system according to one embodiment includes a tape head; a guide mechanism for passing a magnetic recording tape over the head; and a cleaning device for cleaning the head, wherein, while the tape is adjacent the head, a relative spacing between the tape and the head is created before the cleaning device cleans the head, wherein the cleaning device does not contact the tape during cleaning of the head.

In one approach, the cleaning device includes a brush.

The head may be moved out of contact with the tape to create the relative spacing between the tape and the head. For example, the head may retract from the tape. In another approach, the head pivots or rotates out of contact with the tape. In yet another approach, actuation of the cleaning device mechanically moves the head out of contact with the tape.

In one embodiment, the guide mechanism includes at least one guide that moves away from the head to create the relative spacing between the tape and the head. In one approach, the at least one guide moves away from the head along a linear line. In another approach, multiple guides coupled to a common support pivot away from the head. In yet another approach, actuation of the cleaning device mechanically moves the at least one guide away from the head.

The tape may be kept in tension during the cleaning of the head.

In yet another embodiment, actuation of the cleaning device mechanically induces creation of the relative spacing between the tape and the head.

A tape drive system according to one embodiment includes a tape head; a guide mechanism for passing a magnetic recording tape over the head; and a cleaning device for cleaning the head, wherein, while the tape is adjacent the head, a relative spacing between the tape and the head is created before the cleaning device cleans the head, wherein the head is moved out of contact with the tape to create the relative spacing between the tape and the head.

A tape drive system according to one embodiment includes a tape head; a guide mechanism for passing a magnetic recording tape over the head; and a cleaning device for cleaning the head, wherein, while the tape is adjacent the head, a relative spacing between the tape and the head is created before the cleaning device cleans the head, wherein the guide mechanism includes at least one guide that moves away from the head to create the relative spacing between the tape and the head.

A method for cleaning a tape head according to one embodiment includes without unloading a tape from a drive assembly, creating a relative spacing between the tape and the head; inserting a cleaning device into the relative spacing; and cleaning the head using the cleaning device.

A method for selectively creating a relative spacing between the head and a tape according to one embodiment includes during at least one of an idle period, a wind period, and a rewind period: without unloading the tape, creating a relative spacing between the tape and the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should he made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The embodiments described below disclose a new tape head cleaning system and tape drive system implementing the same. Preferred embodiments allow cleaning of the head at any time it is desired without tape unload. Accordingly, a tape drive system according to one embodiment includes a tape head, a guide mechanism for passing a magnetic recording tape over the head, and a cleaning device for cleaning the head.

Figure 1A:
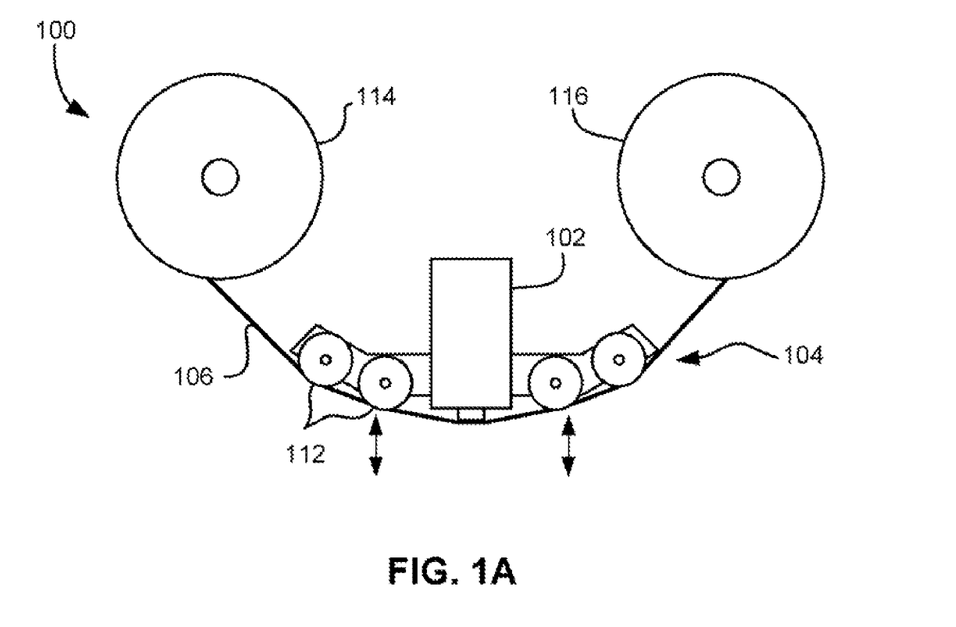
FIG. 1A is a side view of a tape drive system with a tape engaging the head.
Figure 1B:
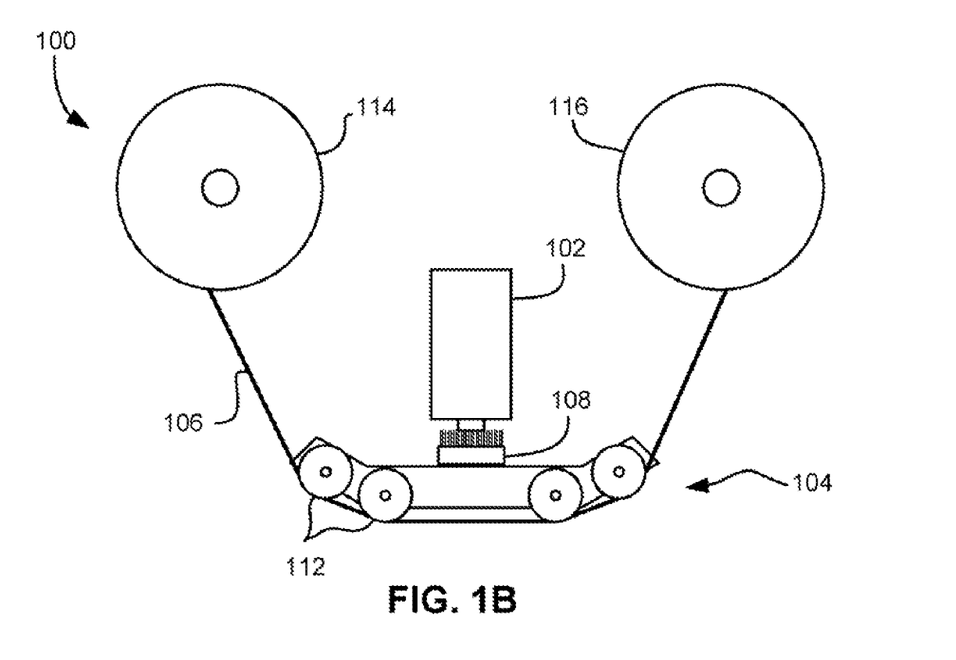
FIG. 1B is a side view of a tape drive system with a tape spaced from the head.

FIGS. 1A-B illustrate a tape drive system 100 according to one embodiment. As shown, the system includes a tape head 102, a guide mechanism 104 for passing a magnetic recording tape 106 over the head, and a cleaning device 108 for cleaning the head. FIG. 1A illustrates the system 100 in read and/or write mode. During a cleaning operation, while the tape 106 is adjacent the head 102, a relative spacing between the tape 106 and the head 102 is created before the cleaning device 108 cleans the head 102. FIG. 1B illustrates such a relative spacing, and an illustrative position of the cleaning device 108 when inserted into the spacing.

Preferably, the cleaning device 108 does not contact the tape 106 during cleaning of the head 102, though contact might occur in some embodiments. Non-contact embodiments are preferred so as to avoid any cleaning-device-induced damage to the tape that could otherwise occur. The tape surface is susceptible to scratching damage, and so the tape head is fabricated with smooth surfaces, and generally no abrupt discontinuities that might scratch the tape. It follows that an object (not part of the guide mechanism) engaging the tape should also be at least as smooth as the head. In addition, there is less chance of debris being transferred from the cleaning device to the tape if there is no contact therewith.

The cleaning device 108 may take many forms. For instance, the cleaning device 108 may include a portion for cleaning the head 102 via a mechanical cleaning action. Illustrative mechanical cleaning actions include traditional brushing movements as well as wiping, touching, etc. The cleaning portion may include a bristled brush, a cotton swab, a fibrous mat such as a piece of cloth, a mass of nonwoven polymer material, etc. Combinations of the foregoing are also contemplated. During a mechanical cleaning action, the cleaning portion of the cleaning device 108 may be moved relative the head 102, such as by being propelled across the head 102 one or more times, e.g., by an actuator or motor. In another approach, the portion of the cleaning device 108 is stationary while the head 102 is made to move, e.g., by actuation. In any case, a unidirectional, bidirectional, rotational, vibrational, etc. movement may be performed by the cleaning device 108 and/or head 102. The direction from which the cleaning device 108 enters the relative spacing is not critical.

Figure 2:
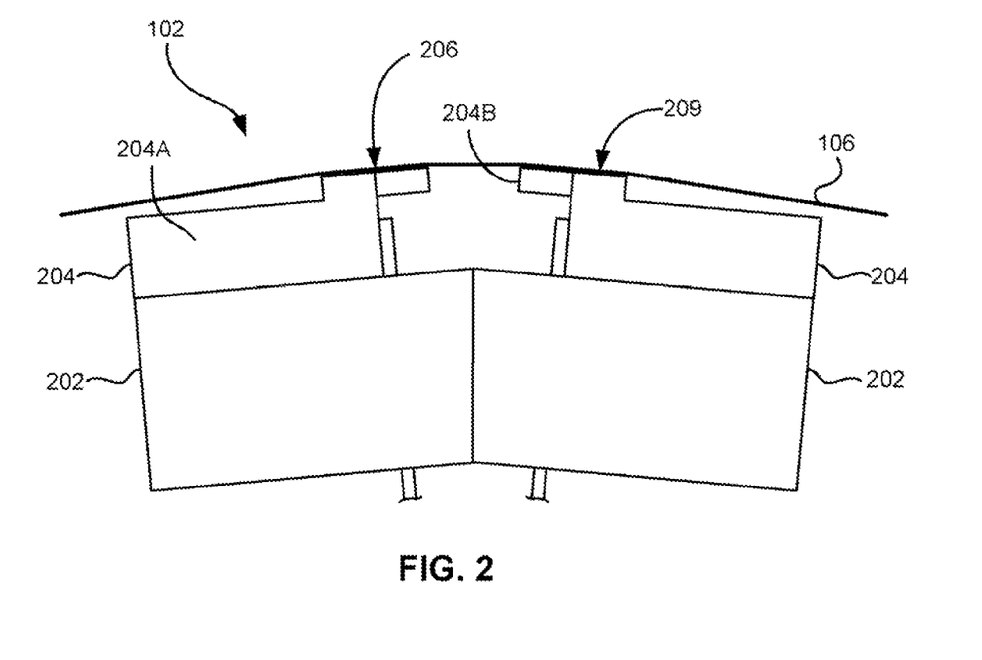
FIG. 2 is a side view of a tape head.

The tape head 102 may be any type of head, including flat-lapped heads, contour profiled heads, rotational heads, contact and noncontact heads, etc. Presented by way of example, FIG. 2 illustrates a traditional flat-lapped bi-directional, two-module magnetic tape head 102. As shown, the head 102 includes a pair of bases 202, each equipped with a module 204. The bases are typically "U-beams" that are adhesively coupled together. Each module 204 includes a substrate 204A and a closure 204B with readers and writers 206 situated therebetween. In use, a tape 106 is moved over the modules 204 along a tape bearing surface 209 in the manner shown for reading and writing data on the tape 106 208 using the readers and writers 206.

During normal operation, the tape 106 is guided from one reel 114, across the head 102 by the guide mechanism 104, and to a second reel 116. The guide mechanism 104 may include guides 112 such as rotational guides (e.g., rollers), nonrelational guides, etc. on one or more sides of the head 102. In the embodiment shown in FIGS. 1A-B, the guide mechanism 104 includes four rollers. It should be noted that any type of guide mechanism known in the art can be used in various permutations of the present invention.

Figure 1C:
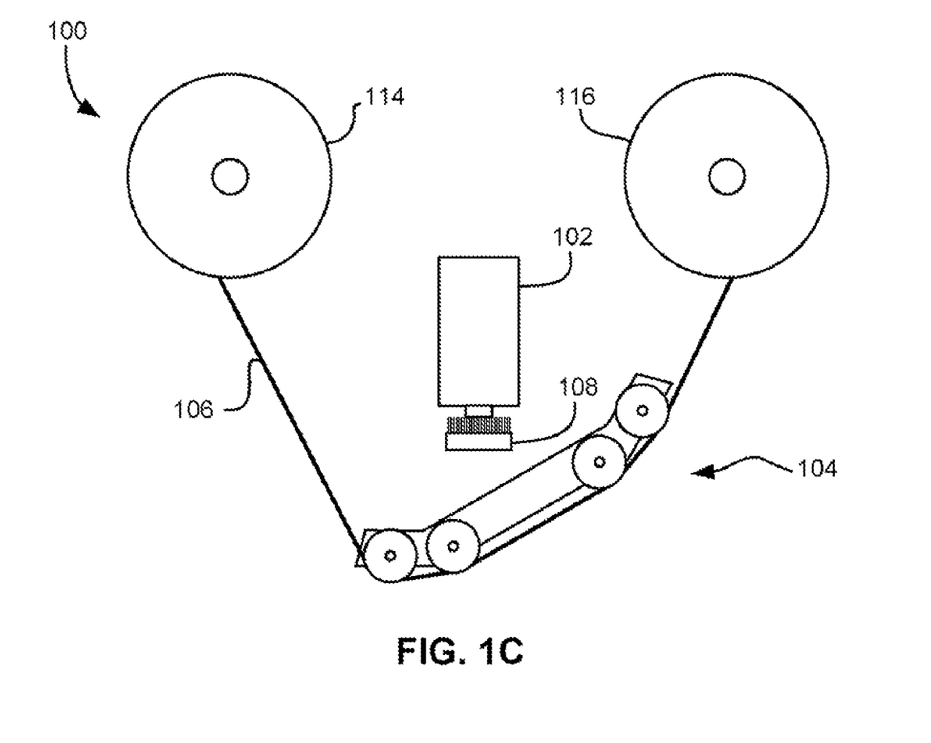
FIG. 1C is a side view of a tape drive system with a tape spaced from the head.
Figure 1D:
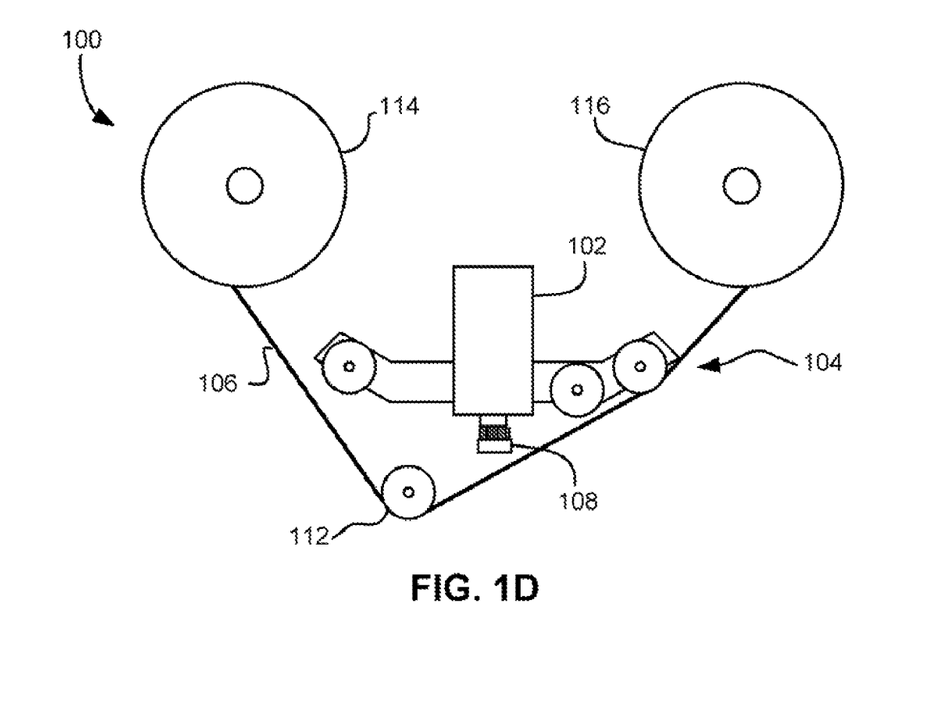
FIG. 1D is a side view of a tape drive system with a tape spaced from the head.

In one embodiment, the guide mechanism 104 includes at least one guide 112 that moves away from the head 102 to create the relative spacing between the tape 106 and the head 102. In one approach, at least one guide 112 moves away from the head 102 along a linear line, carrying the tape 106 away from the head 102. In the example shown in FIGS. 1A-B, the guides 112, which may be coupled to a common substrate, move away from the head 102. In another approach, shown in FIG. 1C, multiple guides, optionally coupled to a common support, pivot away from the head 102, e.g., under influence of an actuator or motor. In another approach, shown in FIG. 1D, one guide moves to create the relative spacing between the tape 106 and head 102.

Figure 1E:
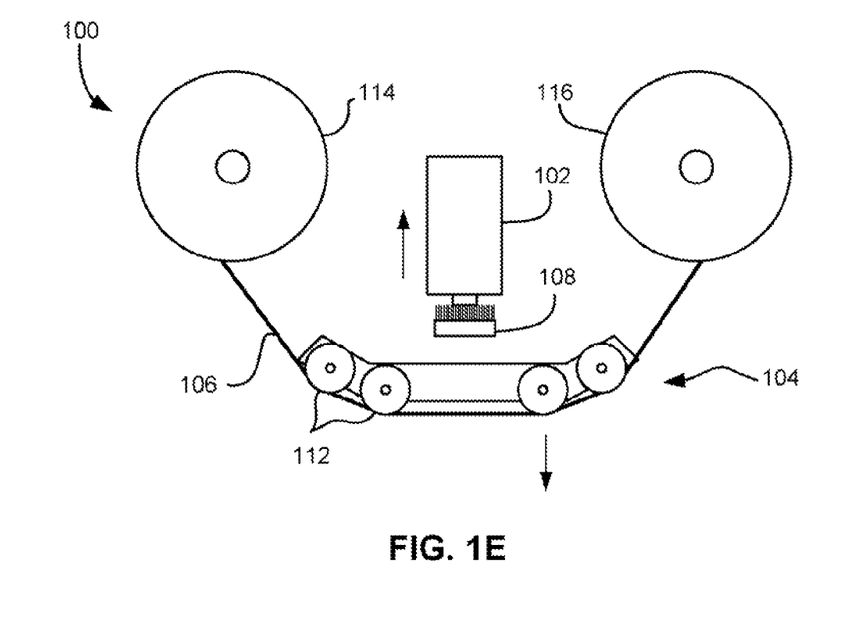
FIG. 1E is a side view of a tape drive system with a tape spaced from the head.

The head 102 may or may not cooperate in creating the relative spacing. For example, FIG. 1E illustrates an embodiment where both the head 102 and the guide mechanism 104 create the relative spacing between the tape 106 and head 102.

Figure 3A:
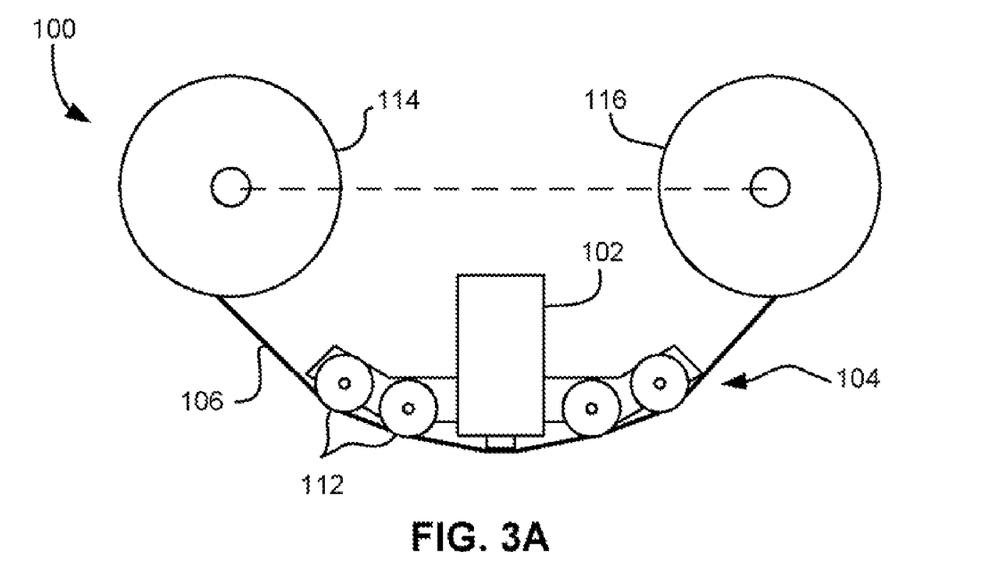
FIG. 3A is a side view of a tape drive system with a tape engaging the head.
Figure 3B:
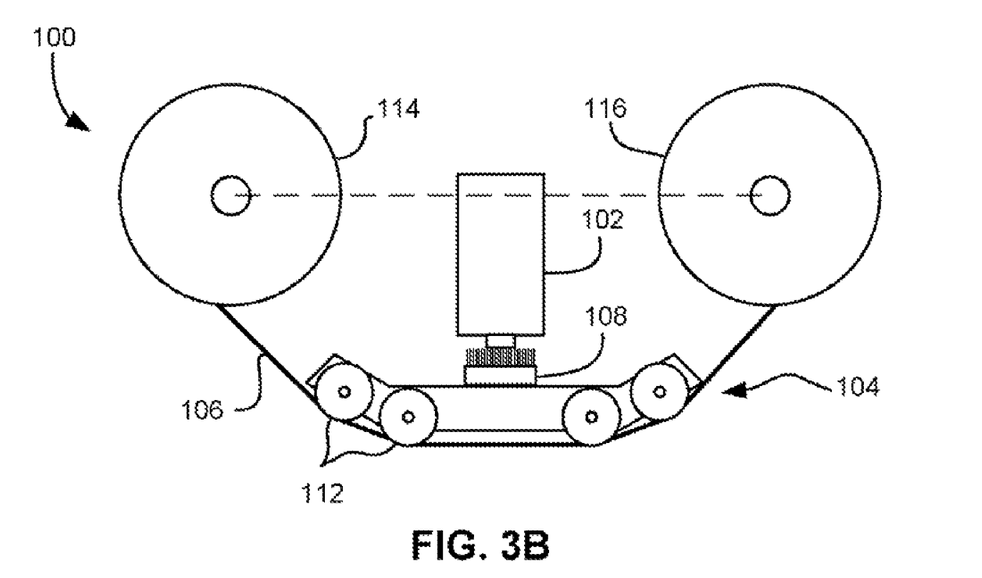
FIG. 3B is a side view of a tape drive system with a tape spaced from the head.
Figure 3C:
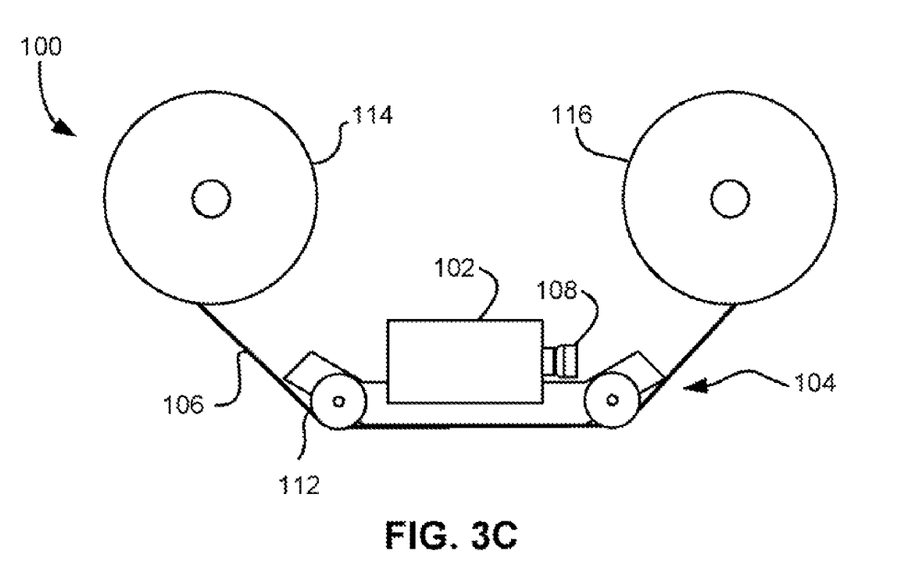
FIG. 3C is a side view of a tape drive system with a tape spaced from the head.

In another embodiment, the head 102 is moved out of contact with the tape 106 to create the relative spacing between the tape 106 and the head 102. As shown in FIGS. 3A-B, for example, the head 102 may be retracted from the tape 106 by an actuator or other mechanism The guide assembly may or may not cooperate in creating the relative spacing. In another approach, generally depicted in FIG. 3C, the head 102 pivots out of contact with the tape 106 by pivoting about a pivot point or rotating about a pivot point. The guide assembly may or may not cooperate in creating the relative spacing.

Actuation of the head 102 and/or guide 112 and/or cleaning device 108 may be performed by any desired mechanism. Illustratively, an actuator or motor coupled to the moving part(s) can be used.

Figure 4A:
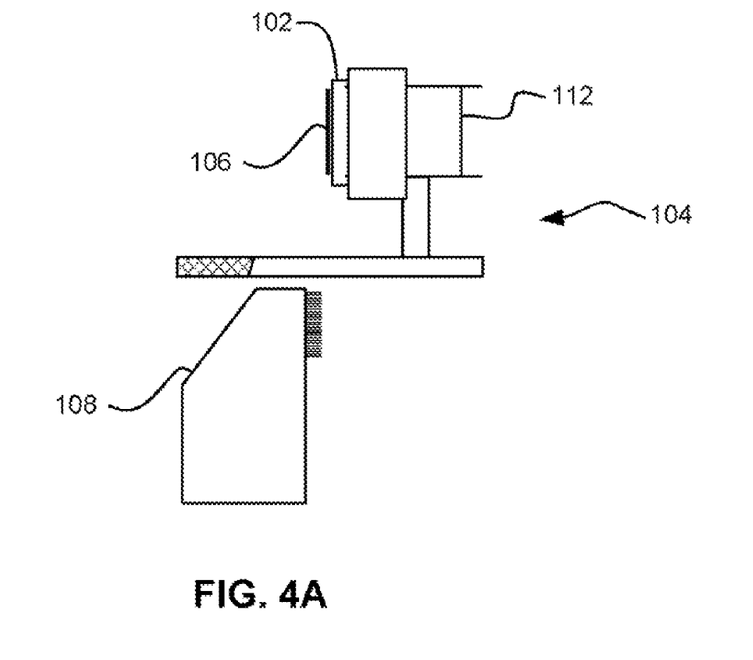
FIG. 4A is a partial cross sectional view of a tape drive system with a tape engaging the head.
Figure 4B:
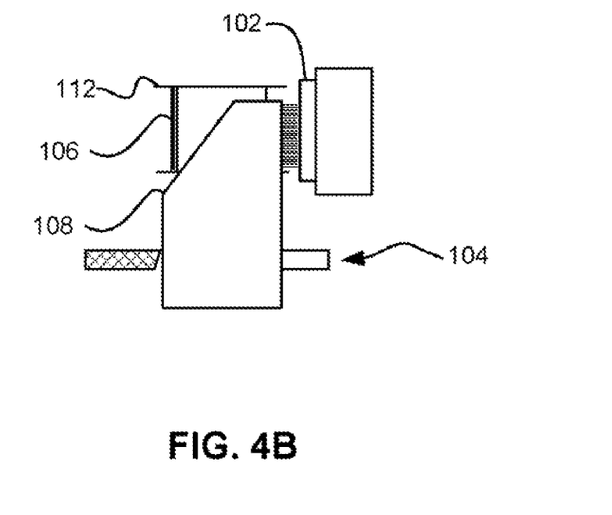
FIG. 4B is a partial cross sectional view of a tape drive system with a tape spaced from the head.

In another approach, actuation of the cleaning device 108 mechanically creates the relative spacing between the tape 106 and the head 102. This may be accomplished by a wedging action, by pushing the appropriate part, by lever action, by gearing, etc. In one approach, as shown in FIGS. 4A-B, actuation of the cleaning device 108 mechanically moves one or more guides 112 away from the head 102 using a wedging action. In another approach, actuation of the cleaning device 108 mechanically moves the head 102 out of contact with the tape 106.

A cleaning operation as set forth herein may be performed at any time, including during idle periods, during read and/or write periods, during rewinding or fast forwarding, during blind (non head-tape contact) seeking, etc. with suspension or stoppage and possible re-initialization of data transfer where appropriate.

Further, some or all of the embodiments may allow selectively creating a relative spacing between the tape and the head, thereby eliminating possible stiction between the tape and the head. Particularly, some embodiments allow lifting of the tape off the head during idle mode. This avoids the potential to produce stiction when the tape needs to start moving again.

Figure 5:
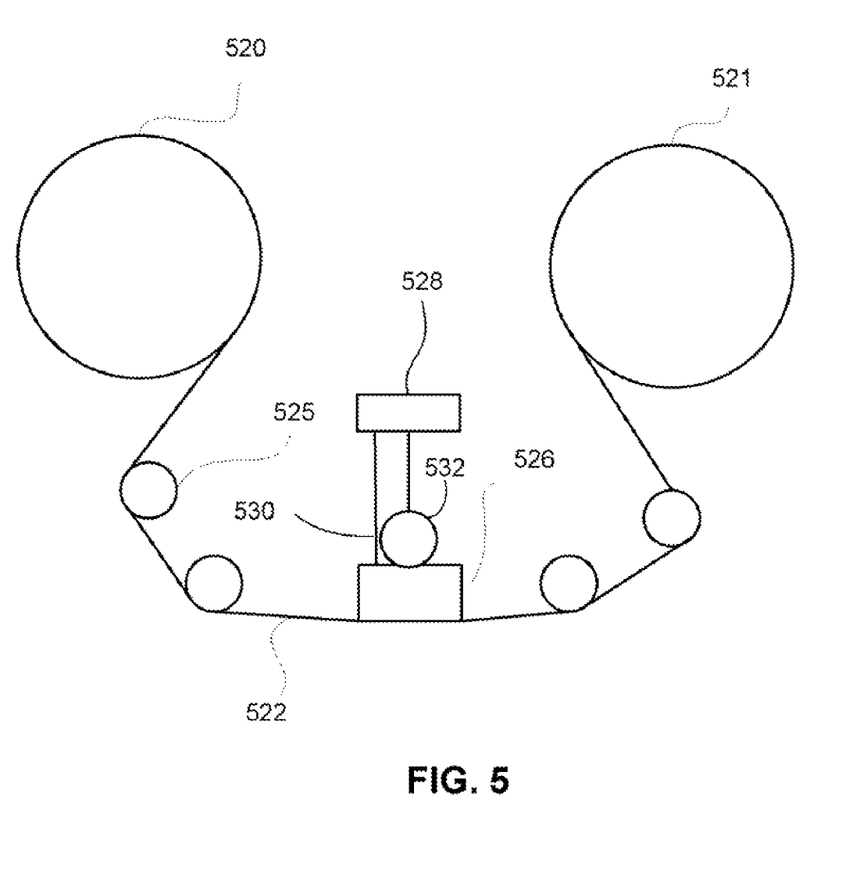
FIG. 5 is a system diagram of a tape drive system.

Also, a relative spacing may be created during wind and/or rewind operations to reduce or remove the likelihood of tape-induced wear on the head, FIG. 5 illustrates a simplified tape drive which may be employed in the context of the present invention. While one specific implementation of a tape drive is shown in FIG. 5, it should be noted that the embodiments described herein may be implemented in the context of any type of tape drive system.

As shown, a tape supply cartridge 520 and a take-up reel 521 are provided to support a tape 522. One or more of the reels may form part of a removable cassette and are not necessarily part of the system. Guides 525 guide the tape 522 across a tape head 526 of any type. Such tape head 526 is in turn coupled to a controller assembly 528 via a write-read cable 530. The controller 528, in turn, controls head functions such as servo following, writing, reading, etc. An actuator 532 controls position of the head 526 relative to the tape 522.

A tape drive, such as that illustrated in FIG. 5, includes drive motor(s) to drive the tape supply cartridge 520 and the take-up reel 521 to move the tape 522 linearly over the head 526. The tape drive also includes a read/write channel to transmit data to the head 526 to be recorded on the tape 522 and to receive data read by the head 526 from the tape 522. An interface is also provided for communication between the tape drive and a host (integral or external) to send and receive the data and for controlling the operation of the tape drive and communicating the status of the tape drive to the host, all as will be understood by those of skill in the art.

A cleaning device, while not shown, may be positioned in the drive where appropriate to perform the desired cleaning action.

Figure 6:
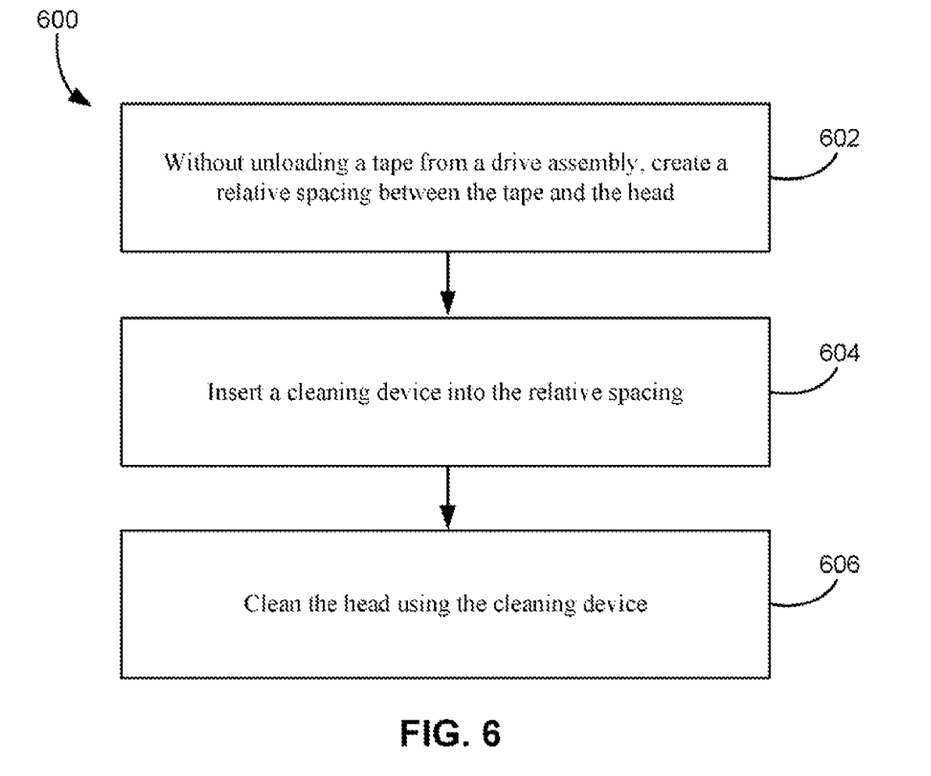
FIG. 6 is a process diagram of a generic method for cleaning a tape head according to one embodiment.

FIG. 6 depicts a generic method 600 for cleaning a tape head according to one embodiment. In operation 602, without unloading a tape from a drive assembly, a relative spacing is created between the tape and the head. In operation 604, a cleaning device is inserted into the relative spacing. In operation 606, the head is cleaned using the cleaning device.

Preferably in this and other embodiments, the tape is kept in tension during the cleaning of the head. For instance, the tape may be kept under constant tension by the motors so no lag or strain develops.

Figure 7:
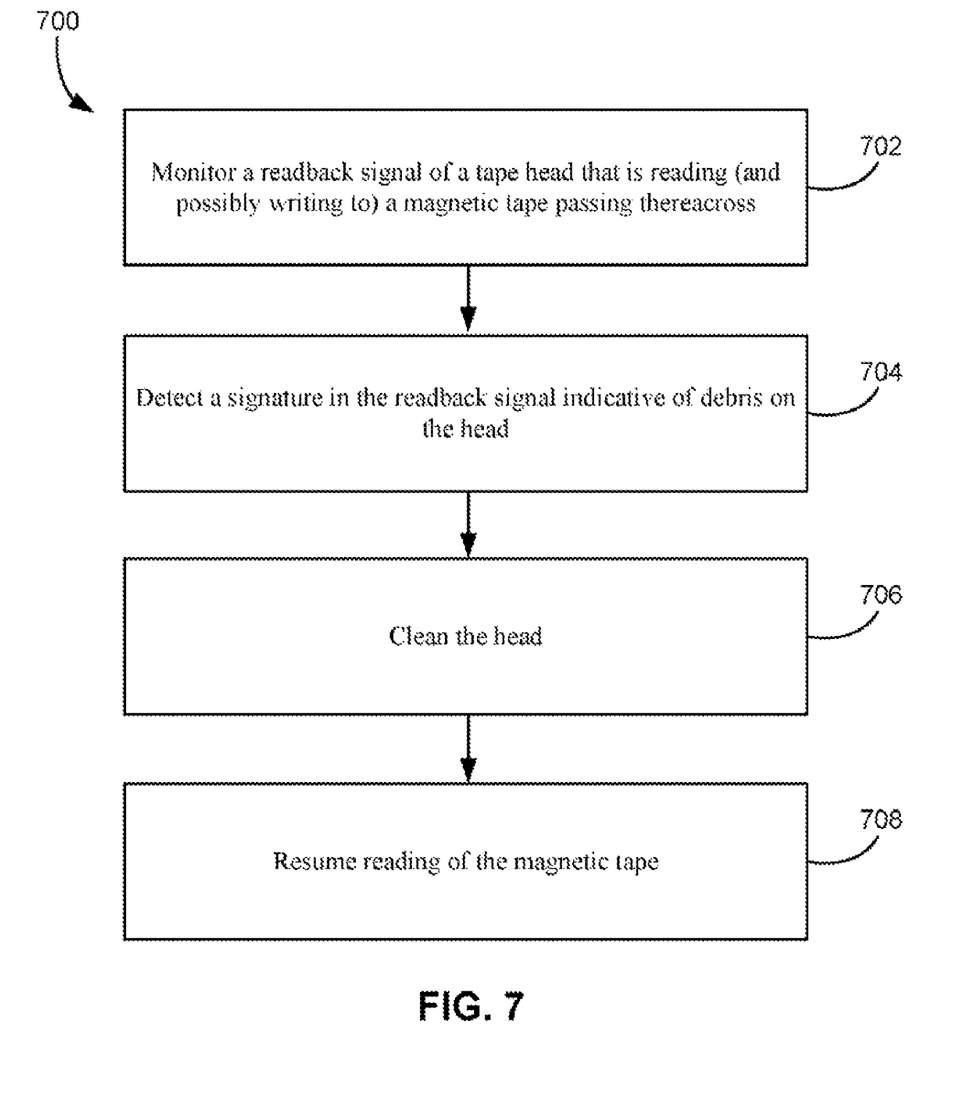
FIG. 7 is a process diagram of a generic method for cleaning a tape head according to one embodiment

FIG. 7 illustrates a method 700 for cleaning a tape head according to another embodiment. In operation 702, a read-back signal of a tape head that is reading (and possibly writing to) a magnetic tape passing thereacross is monitored. Standard error processing circuitry or software known in the art may perform this monitoring. In operation 704, a signature in the readback signal indicative of debris on the head is detected. The signature can be a particular error pattern, signal pattern or feature, etc. that is known or believed to be associated with debris on the head. Such error patterns and signal patterns or features associated with debris on heads are well known to those skilled in the art, and/or can easily be determined for a particular product line by reading a tape. Accordingly, standard error processing circuitry or software can be used with minor modification to the firmware/software so that the signatures are identified via standard techniques such as table look up e.g., where the signature is compared to a set of prestored signatures associated, with various situations; pattern matching, etc. In operation 706, the head is cleaned Operation 706 may include performing some or all of the operations of FIG. 6, but may vary therefrom, and may even include known methods of cleaning a tape head. In operation 708, reading the magnetic tape is resumed after cleaning the head. For example, after the cleaning operation is done, the rollers, head, etc. return to their original positions and the tape returns to contacting the head. The servos may relocate the last position read or written on the tape and the read and/or write operation continues.

During idle mode, to prevent the tape from adhering to the head, a relative spacing between the tape and head may be created and no brushing operation may be called. The relative spacing may be only a fraction of the spacing created during a cleaning operation. The relative spacing may be maintained until when the tape needs to start moving again approximately.

Figure 8:
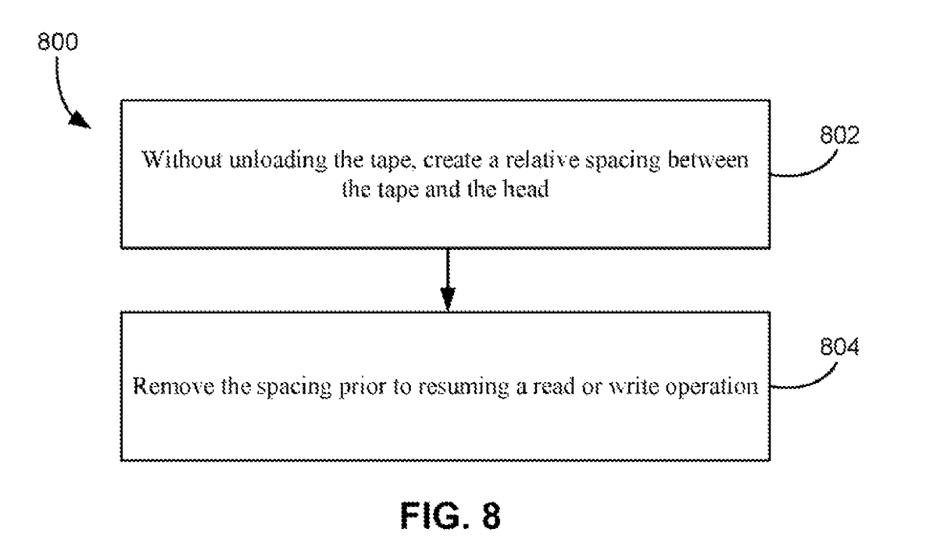
FIG. 8 is a process diagram of a generic method for reducing stiction between the head and a tape according to one embodiment.

FIG. 8 illustrates a method 800 for reducing stiction between the head and a tape according to one embodiment. During an idle period, without unloading the tape, a relative spacing is created between the tape and the head in operation 802. In various embodiments, any mechanism can be used to create the relative spacing. In operation 804, the spacing is removed prior to resuming a read or write operation.

A method for selectively creating a relative spacing between the head and a tape according to yet another embodiment includes, during at least one of an idle period, a wind period, and a rewind period: without unloading the tape, creating a relative spacing between the tape and the head. Again, the wind period and rewind period may refer to periods when the tape is being passed at off of or onto the cartridge spindle. Preferably, the relative spacing is created after the tape is extended across the head.

Some embodiments of the present invention can take the form of an entirely hardware embodiment, other embodiments of the invention can take the form of an entirely software embodiment or an embodiment containing both hardware and software elements. In one preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape drive system, comprising:
   a tape head;
   a guide mechanism for passing a magnetic recording tape over the head; and
   a cleaning device for cleaning the head,
   wherein, while the tape is adjacent the head and in contact with guides positioned on opposite sides of the head, a relative spacing between the tape and the head is created before the cleaning device cleans the head,
   wherein the cleaning device does not contact the tape during cleaning of the head.

2. The system as recited in claim 1, wherein the cleaning device includes a brush.

3. A tape drive system, comprising:
   a tape head; and
   a cleaning device for cleaning the head,
   wherein, while the tape is adjacent the head, a relative spacing between the tape and the head is created before the cleaning device cleans the head,
   wherein the head is moved out of contact with the tape to create the relative spacing between the tape and the head.

4. The system as recited in claim 3, wherein the head retracts from the tape.

5. The system as recited in claim 3, wherein the head pivots or rotates out of contact with the tape.

6. The system as recited in claim 3, wherein actuation of the cleaning device mechanically moves the head out of contact with the tape.

7. The system as recited in claim. 1, wherein the guide mechanism includes at least one guide that moves away from the head to create the relative spacing between the tape and the head.

8. The system as recited in claim 7, wherein the at least one guide moves away from the head along a linear line.

9. The system as recited in claim 7, wherein multiple guides coupled to a common support pivot away from the head.

10. The system as recited in claim 7, wherein actuation of the cleaning device mechanically moves the at least one guide away from the head.

11. The system as recited in claim 1, wherein the tape is kept in tension during the cleaning of the head.

12. The system as recited in claim 1, wherein actuation of the cleaning device mechanically induces creation of the relative spacing between the tape and the head.

13. A tape drive system, comprising:
   a tape head;
   a guide mechanism for passing a magnetic recording tape over the head; and
   a cleaning device for cleaning the head,
   wherein, while the tape is adjacent the head, a relative spacing between the tape and the head is created before the cleaning device cleans the head,
   wherein the head is moved out of contact with the tape to create the relative spacing between the tape and the head.

14. The system as recited in claim 13, wherein the cleaning device does not contact the tape during cleaning of the head.

15. The system as recited in claim 13, wherein the head retracts from the tape.

16. The system as recited in claim 13, wherein the head pivots or rotates out of contact with the tape.

17. The system as recited in claim 13, wherein actuation of the cleaning device mechanically moves the head out of contact with the tape.

18. The system as recited in claim 13, wherein the tape is kept in tension during the cleaning of the head.

19. The system as recited in claim 13, wherein actuation of the cleaning device mechanically induces creation of the relative spacing between the tape and the head.

20. A tape drive system, comprising:
   a tape head;
   a guide mechanism for passing a magnetic recording tape over the head; and
   a cleaning device for cleaning the head,
   wherein, while the tape is adjacent the head, a relative spacing between the tape and the head is created before the cleaning device cleans the head,
   wherein the guide mechanism includes at least one guide that moves away from the head to lift the tape from the head for creating the relative spacing between the tape and the head.

21. The system as recited in claim 20, wherein the cleaning device does not contact the tape during cleaning of the head.

22. The system as recited in claim 20, wherein the at least one guide moves away from the head along at least one of a linear line and an arcuate path.

23. The system as recited in claim 20, wherein multiple guides coupled to a common support pivot away from the head.

24. The system as recited in claim 20, wherein actuation of the cleaning device mechanically moves the at least one guide away from the head.

25. The system as recited in claim 20, wherein the tape is kept in tension during the cleaning of the head.

26. The system as recited in claim 20, wherein actuation of the cleaning device mechanically induces creation of the relative spacing between the tape and the head.

27. A method for cleaning a tape head, comprising:
   without unloading a tape from a drive assembly, creating a relative spacing between the tape and the head;
   inserting a cleaning device into the relative spacing; and
   cleaning the head using the cleaning device,
   wherein the head is moved out of contact with the tape to create the relative spacing between the tape and the head.

28. The method as recited in claim 27, wherein the head is cleaned by a mechanical cleaning action.

29. The method as recited in claim 27, wherein the cleaning device does not contact the tape during the cleaning of the head.

30. The method as recited in claim 27, wherein the guide mechanism includes at least one guide that moves away from the head to help create the relative spacing between the tape and the head.

31. The method as recited in claim 27, wherein the tape is kept in tension during the cleaning of the head.

32. The method as recited in claim 27, further comprising:
monitoring a readback signal of a tape head that is reading a magnetic tape passing thereacross;
detecting a signature in the readback signal indicative of debris on the head;
performing the cleaning the head operation; and
resuming reading of the magnetic tape after cleaning the head.

33. A method for selectively creating a relative spacing between the head and a tape, comprising:
during at least one of an idle period, a wind period, and a rewind period:
without unloading the tape, creating a relative spacing between the tape and the head by at least one of retracting the head from the tape and lifting the tape from the head using a guide.

34. The method as recited in claim 33, wherein the relative spacing is created after the tape is extended across the head.

* * * * *